United States Patent [19]
Takatori et al.

[11] Patent Number: 5,166,247
[45] Date of Patent: Nov. 24, 1992

[54] POLYAMIDE RESIN COMPOSITION FOR FUSIBLE CORE MOLDING AND MOLDED PRODUCT

[75] Inventors: Hiroyuki Takatori; Junji Ueda, both of Ube, Japan

[73] Assignee: Ube Industries, Ltd., Ube, Japan

[21] Appl. No.: 621,586

[22] Filed: Dec. 3, 1990

[30] Foreign Application Priority Data

Dec. 15, 1989 [JP] Japan .................................. 1-323848

[51] Int. Cl.$^5$ .................................................. C08J 3/03
[52] U.S. Cl. ..................................... 524/377; 524/423; 524/425; 524/442; 524/444; 524/447; 524/449; 524/451; 524/606
[58] Field of Search ............... 524/377, 423, 425, 442, 524/444, 447, 449, 451, 606

[56] References Cited

U.S. PATENT DOCUMENTS

| | | | |
|---|---|---|---|
| 2,615,002 | 7/1949 | Hurwitz et al. | 524/377 |
| 3,962,172 | 6/1976 | Wurmb et al. | 524/606 |
| 4,921,896 | 5/1990 | Bonin et al. | 524/432 |

Primary Examiner—Paul R. Michl
Assistant Examiner—Edward Cain
Attorney, Agent, or Firm—Frishauf, Holtz, Goodman & Woodward

[57] ABSTRACT

A polyamide resin composition for fusible core molding which comprises (a) 100 parts by weight of a polyamide resin, (b) 1 to 150 parts by weight of a reinforcing agent and (c) 0.1 to 2.5 parts by weight of a polyvalent alcohol represented by the formula: $HO-(CH_2)_n OH$ wherein n is an integer of 1 to 6, or polyethylene glycol or polypropylene glycol and a molded product obtained by molding the polyamide resin composition.

19 Claims, No Drawings

POLYAMIDE RESIN COMPOSITION FOR FUSIBLE CORE MOLDING AND MOLDED PRODUCT

BACKGROUND OF THE INVENTION

This invention relates a polyamide resin composition excellent in mechanical strength and moldability, which is suitable as a material for producing parts having a complicated shape or for use in a low melting point alloy fusible core method, and a molded product thereof.

A polyamide resin is generally excellent in properties such as mechanical properties, heat resistance and wear resistance, and has been widely used for industrial use including mainly automobile parts and electric parts. Accompanying with it, the usable field of the resin is now further expanding more and more, and resinification of parts having a complicated shape which had been considered to be impossible to resinify has now been carried out. Particularly, in automobile parts, a tendency of resinification in place of metal parts is noticeable in order to lighten the automobile body for improvement of fuel efficiency, decrease costs or improve characteristics such as sound insulating property and heat insulating property, whereby uses of the polyamide resin are increased more and more.

On the other hand, in the field of molding techniques, in order to keep up with production of complicated parts, a fusible core method has ben known as an integrated injection molding method for complicated shapes. This method is a method in which a resin is molded by using a low melting point alloy as a mold core and then the molded product is obtained by melting away the alloy. The method has been employed for the molding of parts having a hollow portion of an undercut portion, particularly engine suction parts such as an intake manifold, a surge tank, or pump parts.

However, when resin molding is carried out by using the fusible core method, if the objective parts are complicated, there are problems that resin molding is difficult since deformation of the core occurs due to pressure at the resin molding or surface failure of the molded product is sometimes generated, and further the alloy is attached and remains on the resin inner surface after dissolving out the core alloy.

SUMMARY OF THE INVENTION

The present inventors have intensively studied to overcome the above problems in the aforesaid fusible core method and consequently found that the problems can be solved by improving the composition of the resin to be used. That is, the present invention has been made in order to improve resin moldability, flowability and releasability of the alloy from the resin.

That is, the present invention relates to a polyamide resin composition for the fusible core method comprising:
  (a) 100 parts by weight of a polyamide resin,
  (b) 1 to 150 parts by weight of a reinforcing agent and
  (c) 0.1 to 2.5 parts by weight of a polyvalent alcohol represented by the formula: $HO-(CH_2)-_nOH$ wherein n is an integer of 1 to 6 or polyethylene glycol or polypropylene glycol and a molded product obtained therefrom.

DESCRIPTION OF THE PREFERRED EMBODIMENTS

The polyamide to be used in the present invention may include polylactams such as nylon 6, nylon 11 and nylon 12; polyamides obtained by dicarboxylic acid and diamine such as nylon 66, nylon 610 and nylon 612; copolymerized polyamides such as nylon 6/66, nylon 6/612, nylon 6/66/610, nylon 6/66/12 and nylon 6/6T (all trade names, and T means terephthalic component) and mutual blended materials thereof.

Of these, nylon 6 and nylon 66 which have high melting point and are excellent in rigidity are preferred.

As the reinforcing agent of the present invention, there may be mentioned, for example, silicates such as calcium silicate, magnesium silicate and aluminum silicate; calcium carbonate, calcium sulfate, glass fibers, wollastonite, talc, kaolin and mica, and they may be used alone or in combination of two or more. Of these, glass fibers are particularly preferred since mechanical properties are excellent. As the glass fiber (diameter; about 5 to 20 $\mu$m), bundled as a glass chopped strand length: about 3 mm) treated with a silane coupling agent is preferably used since a good effect can be obtained. If an amount of the reinforcing agent is out of the range as mentioned above, good formulation cannot be obtained (impossible in pelletizing) and productivity is not so good.

As the polyvalent alcohols to be used in the present invention are alcohols represented by $HO-(CH_2)-_nOH$ (n is an integer of 1 to 6), and specific examples thereof may include 1,4-butanediol, 1,5-pentanediol and 1,6-hexanediol; or polyethylene glycol or polypropylene glycol. Of these, 1,5-pentanediol is particularly preferably used.

They may be used alone or in combination of two or more which may be optionally selected depending on necessity.

An amount of the polyvalent alcohol to be used in the present invention is 0.1 to 2.5 parts by weight, preferably 0.15 to 1.2 parts by weight based on 100 parts by weight of the polyamide.

If the amount of the polyvalent alcohol is less than 0.1 part by weight, there is no effect in alloy releasability, while it exceeds 2.5 parts by weight, bleeding is caused at the surface of the molded product whereby surface properties are lost.

Further, in the polyamide resin composition of the present invention, depending on necessity, additives and modifiers which had been conventionally known such as heat resistant agents, flame retardants, crystalline nucleating agents, lubricants, release agents, antistatic agents, plasticizers, dyes and pigments may be optionally formulated.

The polyamide resin composition of the present invention can be produced by simultaneously melting the polyamide with the reinforcing agent and the polyvalent alcohol and kneading, or mixing the polyvalent alcohol to pellets prepared by melting the polyamide and the reinforcing agent, kneading and pelletizing them.

The composition of the present invention can be used as a resin composition for molding a resin molded product by utilizing the fusible core method. Also, the composition of the present invention can provide a molded product improved in flowability at molding without impairing inherent properties of the polyamide resin, can be molded with a lower pressure (e.g. 600 kg/cm$^2$)

than the conventional ones (generally about 700 kg/cm² even in a complicated shape and in high-filling reinforced material during core molding with depressing deformation of the core, and can be obtained a molded product with good surface property without causing any floating of glass fibers.

In addition, the present invention relates to a resin composition in which the post treatment can be carried out easily by lowering a residual amount of the alloy after melting out the core due to good lubricity at the resin-core alloy interface.

On the other hand, the fusible core method is a method in which a low melting point alloy is used as a mold core and after resin molding, the alloy is removed by melting to mold a complicated shaped product.

As the core alloy, there may be used an alloy having a melting range of 90° to 200° C. which has been known as a low melting point alloy, in which a metal such as Sn, Bi, Pb, Sb and Cd is formulated, preferably an Sn-Bi-Pb-based alloy is used. More preferably, an Sn-Bi-based alloy is used. The core can be produced by casting these low melting point alloys by the conventional casting machine (gravity casting machine, low pressure casting machine, die cast machine and the like).

After resin molding by the use of the core cast by the above alloy, the core alloy is removed by melting from the inner portion of the molded product by dipping said molded product in a heat medium or installing in an induction coil of a high frequency induction heating device.

Also, as the molded product obtained by the resin composition, there may be mentioned automobile parts, particularly, an intake manifold and surging tank which are engine absorption parts having complicated shapes and pump parts such as pump housing and impeller which are required to be high function and high strength and also required to be surface smoothness.

EXAMPLES

In the following, the present invention will be explained by referring to examples and comparative examples.

EXAMPLE 1

To 100 parts by weight of nylon 6 having a relative viscosity of 2.8 (available from Ube Industries, Ltd., UBE 1015B, trade name) was added 43 parts of a glass fiber and the mixture was melted and kneaded by an extruder, and pelletized. To the pelletized material was added 0.4 part by weight of 1,5-pentanediol to obtain a resin composition.

The resin composition thus obtained was measured its physical property according to the following methods.
(1) Tensile strength (ASTM D-638)
(2) Elongation (ASTM D-638)
(3) Flexural strength (ASTM D-790)
(4) Flexural modulus (ASTM D-790)
(5) Izod impact resistance (ASTM D-256)
(6) Flowability (L/T)

Flow length at an injection molding pressure of 500 Kg/cm² or 800 Kg/cm² and at an injection rate of maximum was measured. (Mold temperature: 80° C. and a thickness of 1 mm)

Also, fusible core moldability was measured as shown below.

U alloy 138 (trade name, available from Osaka Asahi Metal Factory, a melting point: 138° C.) which has a low melting point was used as a core material, and casting of a core was carried out by a gravity type casting machine at a 10 casting temperature of 160° C. This core casting product was provided in a resin mold and injection molding was carried out at a resin temperature of 290° C. to cover the core with the resin. Surface property of the molded resin was evaluated with eyes.

Subsequently, by using a high frequency induction heating device HIT-30 (trade name, available from Fuji Denpa Koki, a power: 30 KW and a frequency: 100 KHz), the core was melted to take out. A state of alloys attached on the inner surface of the molded product was evaluated by an attached amount, and the results are shown in Table 1.

The resin molded product used for evaluations is 90° elbow tube having an outer diameter of 30 $\phi$ and an inner diameter of 25$\phi \times$ 120 liters.

EXAMPLE 2

A composition was prepared in the same manner as in Example 1 except for replacing a polyvalent alcohol to be added with 1,6-hexanediol, and evaluations were carried out. The results are shown in Table 1.

EXAMPLE 3

A composition was prepared in the same manner as in Example 1 except for replacing a polyamide resin with nylon 66 (available from Ube Industries, Ltd., UBE2020B, trade name), and evaluations were carried out. The results are shown in Table 1.

COMPARATIVE EXAMPLE 1

The same evaluations were carried out by using a material comprising nylon 6 and 30 % of a glass fiber (available from Ube Industries, Ltd., 1015GC6, trade name) as in Example 1.

The results are shown in Table 1.

COMPARATIVE EXAMPLE 2

The same evaluations were carried out by using a material comprising nylon 6 and 20 % of a glass fiber (available from Ube Industries, Ltd., 1015GU450, trade name) as in Example 1.

The results are shown in Table 1.

COMPARATIVE EXAMPLE 3

The same evaluations were carried out by using a material comprising nylon 66 and 30 % of a glass fiber (available from Ube Industries, Ltd., 2020GC6, trade name) as in Example 1.

The results are shown in Table 1.

TABLE 1

| | (Measurement of physical property: absolutely dried state normal temperature) | | | | | | |
|---|---|---|---|---|---|---|---|
| Item | Unit | Example 1 | Example 2 | Example 3 | Comparative example 1 | Comparative example 2 | Comparative example 3 |
| Tensile strength | kg/cm² | 1700 | 1700 | 1800 | 1700 | 1300 | 1800 |
| Elongation | % | 5 | 5 | 5 | 5 | 5 | 5 |
| Flexural strength | kg/cm² | 2500 | 2500 | 2600 | 2500 | 2000 | 2600 |

TABLE 1-continued (Measurement of physical property: absolutely dried state normal temperature)

| Item | Unit | Example 1 | Example 2 | Example 3 | Comparative example 1 | Comparative example 2 | Comparative example 3 |
|---|---|---|---|---|---|---|---|
| Flexural modulus | kg/cm$^2$ | 80000 | 80000 | 85000 | 80000 | 60000 | 85000 |
| Izod impact strength with ⅛" notch | kg · cm/cm | 9 | 9 | 9 | 9 | 8 | 9 |
| L/T | Injection pressure | | | | | | |
| t = 1 mm | 500 kg/cm$^2$ | 100 | 90 | 100 | 60 | 130 | 80 |
|  | 800 kg/cm$^2$ | 140 | 120 | 130 | 100 | 200 | 120 |
| Elbow tube molded product Remained amount (g) of alloy at inner surface | | 0.5 | 1 | 0.5 | 5 | 5 | 5 |
| Surface property of molded product | — | ⊙ | ⊙ | ⊙ | ○ | ○ | △ |

⊙: Very good, ○: Good, △: Slightly good

According to the present invention, by adding a polyvalent alcohol to a polyamide resin, a resin composition improved in flowability, surface property and releasability from a metal and showing excellent moldability and alloy melting property during resin molding using a low melting point alloy as a core can be obtained, and thus, it can be used for various uses mainly in automobile suction parts.

We claim:

1. A polyamide resin composition for fusible core molding excellent in alloy releasability which comprises
   (a) 100 parts by weight of a polyamide resin,
   (b) 1 to 150 parts by weight of a reinforcing agent and
   (c) 0.1 to 2.5 parts by weight of a polyvalent alcohol represented by the formula: HO—(CH$_2$)—$_n$OH wherein n is an integer of 1 to 6, or polyethylene glycol or polypropylene glycol.

2. The polyamide resin composition according to claim 1, wherein said polyamide is selected from the group consisting of a polylactam, a polyamide obtained by dicarboxylic acid and diamine, a copolymerized polyamide and a mixture thereof.

3. A polyamide resin composition according to claim 2, wherein said polyamide is selected from the group consisting of nylon 6, nylon 11, nylon 12, nylon 66, nylon 610, nylon 612, a mixture or a copolymer of nylon 6 and nylon 66, a mixture or a copolymer of nylon 6 and nylon 612, a mixture or a copolymer of nylon 6, nylon 66 and nylon 610, a mixture or a copolymer of nylon 6, nylon 66 and nylon 12, a mixture or a copolymer of nylon 6 and a copolymer of nylon 6 and terephthalic acid, and mutual blended materials thereof.

4. The polyamide resin composition according to claim 1, wherein said polyamide is nylon 6 or nylon 66.

5. The polyamide resin composition according to claim 1, wherein said reinforcing agent is selected from the group consisting of a silicate, calcium carbonate, calcium sulfate, a glass fiber, wollastonite, talc, kaolin and mica.

6. The polyamide resin composition according to claim 5, wherein said silicate is selected from the group consisting of calcium silicate, magnesium silicate and aluminum silicate.

7. The polyamide resin composition according to claim 5, wherein said reinforcing agent is a glass fiber.

8. The polyamide resin composition according to claim 1, wherein said polyvalent alcohol of the formula HO—(CH$_2$)—$_n$OH is selected from the group consisting of 1,4-butanediol, 1,5-pentanediol and 1,6-hexanediol.

9. The polyamide resin composition according to claim 8, wherein said polyvalent alcohol is 1,5-pentanediol.

10. The polyamide resin composition according to claim 8, wherein an amount of said polyvalent alcohol is 0.15 to 1.2 parts by weight based on 100 parts by weight of the polyamide.

11. The polyamide resin composition according to claim 1, wherein said composition comprises
   (a) 100 parts by weight of nylon 6 or nylon 66,
   (b) 1 to 150 parts by weight of a glass fiber and
   (c) 0.1 to 2.5 parts by weight of 1,5-pentanediol.

12. The polyamide resin composition according to claim 1, wherein the polyvalent alcohol is in an amount of 0.15 to 1.2 parts by weight based on 100 parts by weight of the polyamide.

13. The polyamide resin composition according to claim 1, wherein the polyamide is nylon 6 or nylon 66; the reinforcing agent is selected from the group consisting of calcium silicate, magnesium silicate, aluminum silicate, calcium carbonate, calcium sulfate, a glass fiber, wollastonite, talc, kaolin and mica; and the polyvalent alcohol is 1,4-butanediol, 1,5-pentanediol or 1,6-hexanediol.

14. The polyamide resin composition according to claim 7, wherein said glass fiber is in the form of chopped strands having a diameter of about 5 to 20 μm and a length of about 3 mm.

15. The polyamide resin composition according to claim 7, wherein said glass fiber is a glass fiber treated with a silane coupling agent.

16. The polyamide resin composition according to claim 1, wherein the polyamide is nylon 6 or nylon 66; the reinforcing agent is a glass fiber in the form of chopped strands having a diameter of about 5 to 20 μm and a length of about 3 mm; and the polyvalent alcohol is 1,5-pentanediol or 1,6-hexanediol.

17. The polyamide resin composition according to claim 1, wherein the polyvalent alcohol is in an amount of 0.15 to 1.2 parts by weight based on the weight of the polyamide.

18. The polyamide resin composition according to claim 1, wherein the polyvalent alcohol is in an amount of about 0.4 parts by weight based on the weight of the polyamide.

19. The polyamide resin composition according to claim 16, wherein the polyvalent alcohol is in an amount of about 0.4 parts by weight based on the weight of the polyamide.

* * * * *